United States Patent

[11] 3,607,606

| [72] | Inventor | Duane H. Beninga<br>Golden, Colo. |
|---|---|---|
| [21] | Appl. No. | 643,787 |
| [22] | Filed | May 16, 1967 |
| [45] | Patented | Sept. 21, 1971 |
| [73] | Assignee | Coors Porcelain Company<br>Golden, Colo. |

[54] CERAMIC-RUBBER COMPOSITES
4 Claims, 9 Drawing Figs.

[52] U.S. Cl. ..................... 161/162,
161/39, 161/40, 161/168, 161/217, 161/221
[51] Int. Cl. ..................... B32b 5/16,
B32b 25/02, B32b 15/06
[50] Field of Search ..................... 161/216,
217, 219, 36, 37, 38, 39, 158, 162, 164, 168, 202,
203, 204, 221, DIG. 1, DIG. 5; 52/181, 315, 318,
389, 390; 106/55, 62, 45, 46

[56] References Cited
UNITED STATES PATENTS

| 2,491,412 | 12/1949 | Lecuir .................. | 106/62 |
| 3,208,190 | 9/1965 | Kakos et al. ............ | 161/206 X |
| 2,947,056 | 8/1960 | Csordas et al. .......... | 106/39 X |
| 3,167,438 | 1/1965 | Bristow ................. | 106/46 |
| 3,377,176 | 4/1968 | Wolkodoff et al. ........ | 106/46 |
| 790,260 | 5/1905 | Munro ................... | 52/315 X |
| 2,265,735 | 12/1941 | Lambert ................. | 52/181 X |
| 2,266,510 | 12/1941 | Pottinger ............... | 52/189 X |
| 2,336,388 | 12/1943 | Beebe ................... | 161/243 X |
| 2,852,932 | 9/1958 | Cable ................... | 52/389 X |
| 3,319,392 | 5/1967 | Fitzgerald .............. | 52/389 |
| 3,335,048 | 8/1967 | Morain .................. | 161/38 |
| 3,444,033 | 5/1969 | King .................... | 161/39 X |

FOREIGN PATENTS

| 1,291,148 | 3/1962 | France .................. | 161/161 |

OTHER REFERENCES

Industrial Ceramics, Singer et al., Chapman & Hall Ltd. 1963 p. 1230

*Primary Examiner*—John T. Goolkasian
*Assistant Examiner*—George W. Moxon, II
*Attorney*—Barnard, McGlynn & Reising ABSTRACT: A composite of rubber, natural or synthetic, and alumina-base ceramic, useful as a wear-resistant lining for ball mills, conveyors, chutes and the like, comprising a layer of rubber having embedded in and bonded to the surface thereof closely spaced shaped bodies of alumina-base ceramic. Such composite is made by molding and thereby bonding the rubber material to the shaped alumina-base ceramic bodies either directly or preferably through an intermediate bonding layer applied to the ceramic bodies prior to the molding operation.

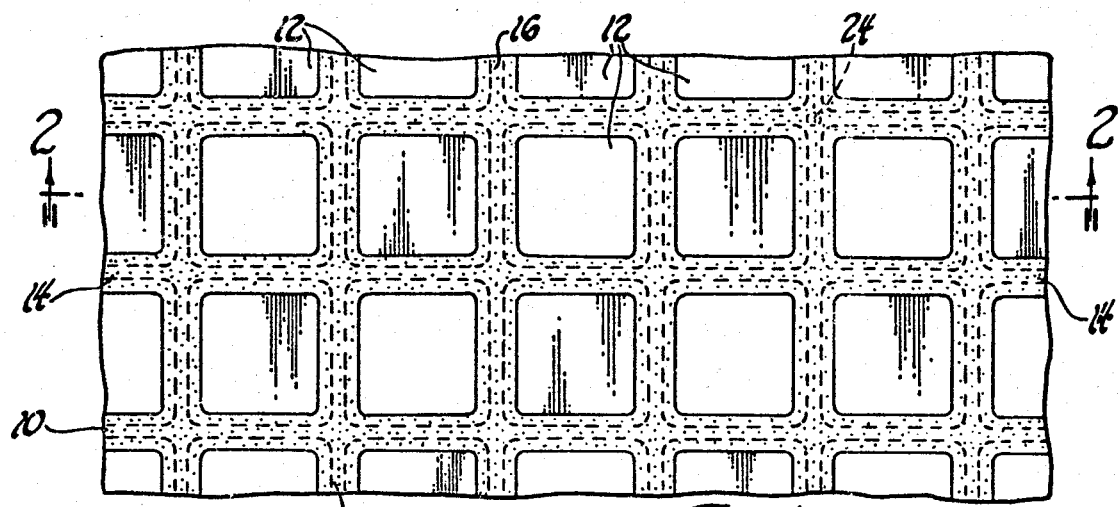
Fig. 1
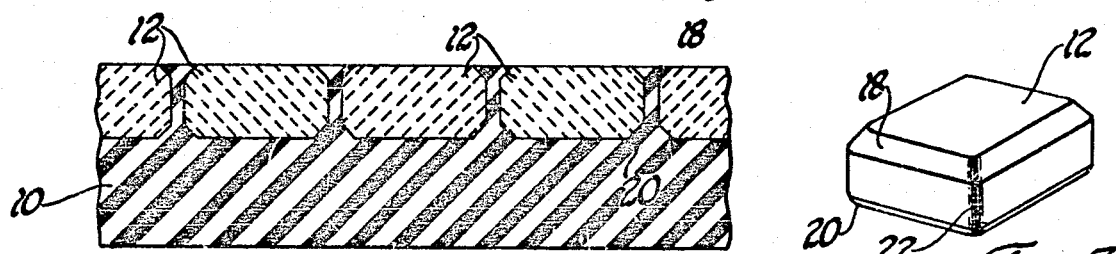
Fig. 2
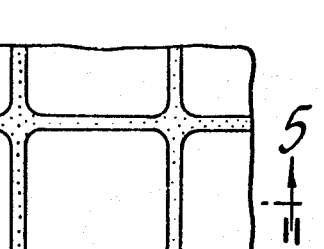
Fig. 3
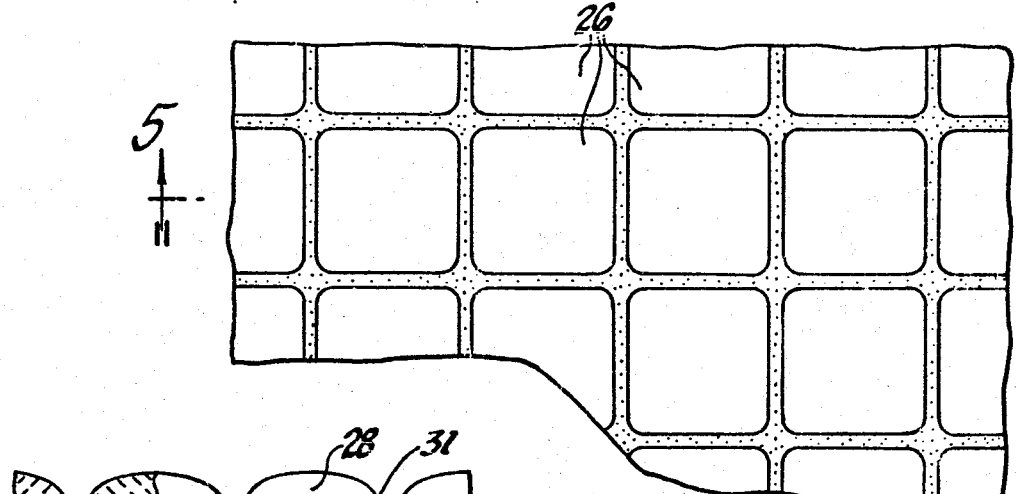
Fig. 4
Fig. 5
INVENTOR
Duane H. Beninga INVENTOR
Duane H. Beninga
BY
Bernard, McGlynn & Reising
ATTORNEYS

CERAMIC-RUBBER COMPOSITES

The present invention relates to composites having spaced shaped ceramic bodies embedded in and bonded to a rubber backing and particularly useful as linings for chutes for abrasive materials, conveyors, ball mills and the like.

At the present state of the art, linings for chutes and the like to convey or carry abrasive materials are conventionally made of hard metal. Of course it is well known that ceramic provides greater wear or abrasion resistance than does metal; however, ceramic is deficient in mechanical shock resistance and hence it is subject to cracking, particularly where the abrasive material is in the form of large masses, such as metal ores, which create considerable impact.

It is an object of the present invention to provide a composite or ceramic and rubber which has wear resistance equal to that of ceramic while at the same time having mechanical shock resistance ample to assure against cracking of the ceramic due to impact. By means of the invention, liners for chutes, conveyors, ball mills and the like having optimum strength and wear resistance, crack resistance and flexibility, and hence optimum durability, can be attained.

Briefly, the present invention comprehends a rubber-ceramic composite comprising sintered alumina-base ceramic bodies embedded in and bonded to the surface of a rubber layer in closely spaced relationship to each other. The size of each ceramic body in its largest dimension in the plane of the rubber layer should preferably be less than seven times the thickness of the ceramic body and each ceramic body should preferably be embedded in the rubber layer to a depth of at least 50 percent of the thickness of the ceramic body. With such a composite, the elastomeric material which backs and surrounds the ceramic bodies imparts great impact resistance to the ceramic bodies thereby assuring against cracking, and since most of the surface of the composite is composed of ceramic, the wear resistance is substantially equal to that which can be accomplished with a 100-percent ceramic surface.

Other objects, features and advantages of the invention will appear more clearly from the following detailed description thereof made with reference to the accompanying drawings in which:

FIG. 1 is a top plan view of a composite made in accordance with the invention;

FIG. 2 is a section taken on the line 2—2 of FIG. 1;

FIG. 3 is a perspective view of one of the ceramic bodies of the composite shown in FIGS. 1 and 2;

FIG. 4 is a top plan view of another embodiment of the invention;

FIG. 5 is a view taken on the line 5—5 of FIG. 4;

Figure 6:
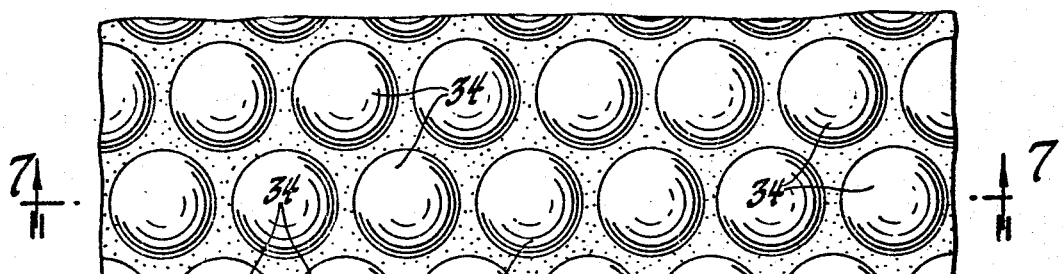
FIG. 6 is a top plan view of another embodiment of the invention.

Referring now to the drawings, the composite shown in FIGS. 1 and 2 comprises a layer 10 of rubber or other elastomeric material having embedded in and bonded to the surface thereof generally square-shaped ceramic bodies 12, one of such ceramic bodies being shown in perspective in FIG. 3. The ceramic bodies 12 are arranged in a pattern of aligned rows, both vertically and horizontally, each ceramic body being slightly spaced from all the ceramic bodies surrounding it. Hence, the composite is flexible by reason of the bend axes, both vertical and horizontal, provided by the uninterrupted lines of rubber extending in both directions, vertical and horizontal, across the rubber between the aligned rows of ceramic bodies. One such horizontal bend axis is shown at 14 and one such vertical bend axis is shown at 16.

To assure against edge cracking of the ceramic, each of the bodies 12 has tapered or rounded upper, lower and side edges as shown at 18, 20 and 22 respectively, such that all edge angles are greater than about 100°. This feature also prevents damage to the rubber between adjacent ceramic pieces from flexure of the composite. Additionally, the rounding of t side edges 22 provides a somewhat larger spacing between a jacent corners of adjacent ceramic bodies to enable amp room for a screw or similar fastener, as illustrated at 24 in FI 1, for securing the composite to the metal backing wall (n shown) of a chute, ball mill or the like.

In the particular embodiment shown in FIGS. 1 and 2, ea ceramic body is 1 inch square and has a thickness of abo one-half inch. The spacing between the sides of adjace ceramic bodies should not be less than about one-sixteen inch and in the particular embodiment shown in FIGS. 1 and the spacing is about one-eighth inch.

The ceramic bodies used in the practice of the invention a of sintered aluminum-oxide-base ceramic. Such ceramic co tains upwards of about 85 percent by weight aluminum oxi and the remainder small amounts of mineralizers or glas forming oxides which can be added as silica, the silicates suc as clay and talc, the alkali and alkaline earth oxides, ca bonates, phosphates and the like such as the oxide phosphates or carbonates of sodium, calcium, strontium ar magnesium; and various other of the metal oxides such chromium oxide, manganese oxide and the rare-earth oxid well known in the art for their glass-modifying or grain grow inhibiting effect when used in small amounts in high alumir ceramics. Aluminum-oxide-base ceramic is extremely har abrasion resistant and tough as compared with other ceramic Examples of specific sintered aluminum oxide base cerami are as follows, the percentages in each case being by weigh 100 percent aluminum oxide; 99.5 percent aluminum oxid 0.5 percent chromium oxide; 94 percent aluminum oxide, percent silica, 3 percent calcium oxide; 90 percent aluminu oxide, 5 percent silica, 3 percent magnesium oxide, 2 percer calcium oxide; 85 percent aluminum oxide, 10 pe cent silic 3 percent calcium oxide and 2 percent magnesium oxide. In a of these examples where silica is present in the raw batcl either as such or in a combined form, the final ceramic struc ture after the sintering operation consists of a dense body c aluminum oxide crystals with an intercrystalline glassy phase Where silica or other glass-forming ingredient is not include the aluminum oxide crystals are bonded to each other in th sintering operation. It should be understood that the abov specific examples of high alumina ceramic formulations and c additive ingredients for the formulation thereof are only fo purposes of illustration and the invention is not limited theret since numerous other alumina base ceramic formulations ar well known in the art and are in widespread commercia manufacture.

Such high alumina sintered ceramics are conventionall manufactured by (1) milling the raw batch ingredients, (2 forming the raw batch into shaped articles by any of variou well known techniques, such as by admixing therewith an or gar material, for example wax or a resin, as a temporar binder, and then isostatic or injection molding or dry pressing and (3) subsequently firing the shaped pieces to sintering tem perature which can be anywhere from about 1,400° to 1,950 C. In general, the higher the alumina content, the higher th temperature required for sintering to a dense nonporous body The rubber layer can of natural rubber or any of th synthetic rubbers well known inn the art and should have a resiliency of from about 30 to 70 Durometer on the A scale The thickness of the rubber layer under the ceramic bodie should be at least equal to that portion of the thickness of the ceramic bodies which is embedded in the rubber, this in orde to provide optimum impact resistance. In the particular em bodiment shown in FIGS. 1 and 2, the total thickness of the rubber layer is about 1¼ inches and hence the thickness of the layer beneath the ceramic bodies is about three-fourths of an inch, the ceramic bodies being embedded in the elastomer to the extent of their full thickness, i.e. one-half of an inch.

To manufacture the composite, the ceramic bodies are arranged in the pattern desired and the rubber molded and vulcanized against the back surfaces thereof. To simplify this operation the upper surfaces of the ceramic bodies can be bonded to cloth or the like and the rubber then molded against the back surface of the ceramic bodies secured to the cloth.

For improved bond strength between the ceramic and the rubber it is preferable that the ceramic bodies be provided with a thin intermediate bonding layer. Titanium metal is excellent as the intermediate bonding layer and can best be applied by physically rubbing or abrading titanium metal against the ceramic bodies. For example, the ceramic bodies such as shown in FIG. 3, can be placed in a tumbling drum along with pellets of titanium metal and the drum rotated to thereby cause the titanium pellets to come into repeated rubbing contact with the ceramic bodies. After a few hours of such tumbling the surfaces of the ceramic bodies will have deposited thereon a thin layer of titanium. Other metals such as aluminum or brass can be used but titanium is best. Alternatively, a thin layer of organic resin, such as epoxy resin, can be applied to the ceramic bodies to increase the bond strength between the ceramic and the rubber.

Whereas the ceramic bodies shown are of rectangular shape it will be understood that triangular-shaped bodies may be used to accomplish the same extent of ceramic coverage on the surface of the rubber layer as well as the desirable bend axes between adjacent rows of ceramic bodies. Hexagonal-shaped bodies may also be used, in a honeycomb pattern, though at the expense of flexibility since such a pattern does not provide the uninterrupted lines of rubber which serve as bend axes across the composite. Other ceramic shapes may also be used.

The embodiment shown in FIGS. 4 and 5 is the same as that shown in FIGS. 1 and 2 except for the shape of the alumina-base ceramic bodies. In the FIG. 4-5 embodiment, the ceramic bodies are about 1 inch square in plan view but have upper and lower rounded surfaces, 28 and 30 respectively, the bottom rounded surface having a smaller radius of curvature than that of the top surface. The side surfaces 31 are rounded as viewed in elevation and the corners are rounded both in plan and elevation.

Figure 7:
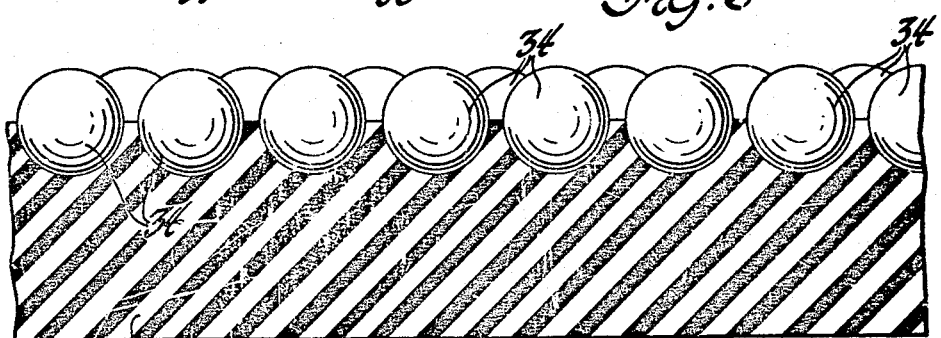
FIG. 7 is a view taken on the line 7—7 of FIG. 6.

The embodiment shown in FIGS. 6 and 7 consists of alumina-base ceramic spheres 34 embedded in the elastomeric layer 36 to the extent of one-half their thickness or diameter. To provide increased ceramic coverage over the surface of the composite, the spheres are arranged in staggered rows such that any three adjacent spheres define the apices an equilateral triangle. In the particular embodiment shown, the spheres are three-fourths of an inch in diameter and the total thickness of the elastomer layer is 1½ inch. The spacing between adjacent spheres is about three thirty-seconds of an inch. This embodiment incorporating spherical ceramic bodies provides greater impact resistance than does that shown in FIGS. 1-2 and is particularly useful for such applications as linings for truck beds used to carry rocks or the like.

The ceramic body shape utilized in the embodiment shown FIGS. 4 and 5 approximates a sphere and hence also provid increased impact resistance over the ceramic shape shown FIG. 3 and yet by reason of the generally square shape, in pl view, gives an equal amount of ceramic coverage over the su face of the composite. The increased impact resistance i however, gained at the expense of added weight by reason the greater mass of the ceramic bodies.

Figure 8:
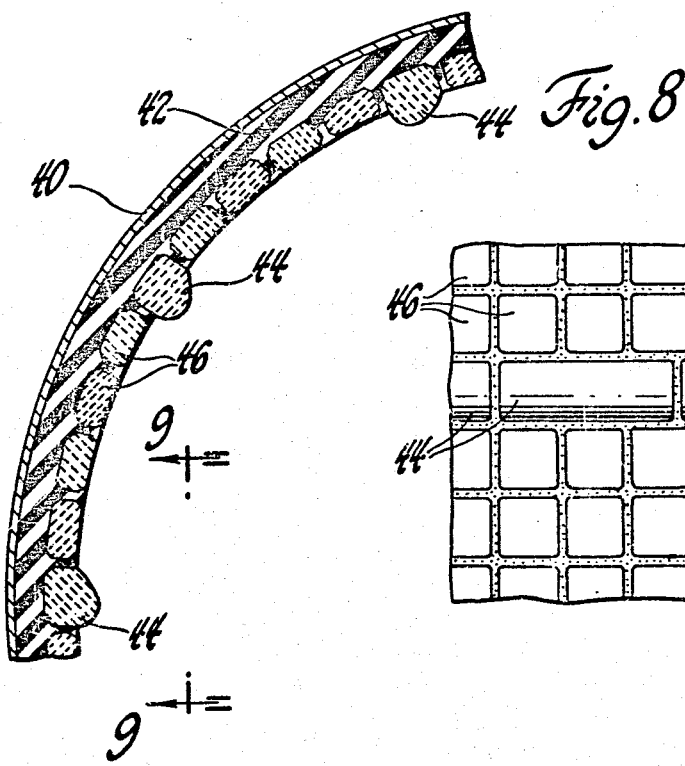
FIG. 8 is a cross-sectional view of a portion of a ball mill liner made in accordance with the invention.
Figure 9:
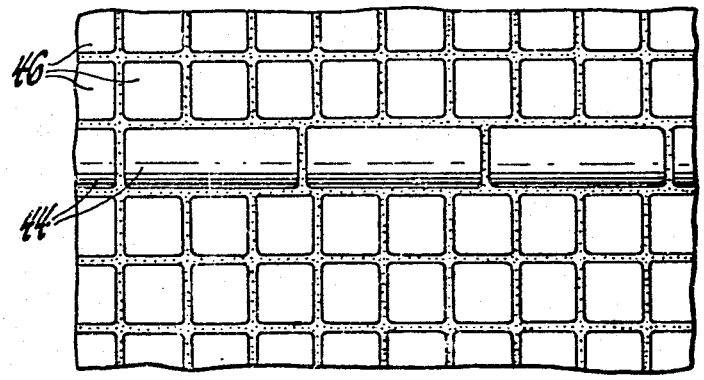
FIG. 9 is a view of the mill liner taken on the line 9—9 of FIG. 8.

FIGS. 8 and 9 show a ball mill lining made in accordanc with the invention. The cylindrical metal wall of the ball mill shown at 40. The composite lining consists of axially exten ing rows of ceramic bodies embedded in an elastomeric lay 42. Each fifth row consists of ceramic bodies 44 which are elongated rectangular shape, in plan view, and with upper exposed surfaces which are of rounded cross section ar which extend outwardly towards the center of the ball mi The other rows consist of square ceramic bodies 46 the san as those shown in FIGS. 1-3. The upper, side and back edg of the ceramic bodies 44 are rounded for the reasons set for above. During operation of the ball mill, the extende rounded surfaces of the ceramic bodies 44 cause the balls (n shown) in the ball mill to be tossed toward the center of tl mill during mill rotation and hence assist in the efficiency the milling or grinding operation.

It will be understood that while the invention has be described with reference to preferred embodiments therec various changes may be made within the full and intend scope of the claims which follow:

The embodiments of the invention in which an exclusi property or privilege is claimed are defined as follows:

1. A rubber-ceramic composite comprising a layer resilient rubber having embedded therein and bonded there at the surface thereof a plurality of closely spaced sintere ceramic bodies containing at least about 85 percent by weig aluminum oxide, each of said ceramic bodies having a sha wherein all contiguous surface areas of the body meet at a gles of greater than about 100° such that said ceramic bodi present no sharp edges and each of said ceramic bodies bei embedded in said rubber layer to a depth of at least 50 perce of the thickness of the body, said rubber layer having thickness underlying said ceramic bodies at least equal to th portion of the thickness of the ceramic bodies which is e1 bedded in the rubber layer.

2. A rubber-ceramic composite as set forth in claim wherein the size of each of said ceramic bodies in its large dimension in the plane of the layer of rubber is less than sev times the thickness of the body.

3. A rubber-ceramic composite as set forth in claim wherein said rubber has a resiliency of from about 30 to Durometer on the A scale.

4. A composite as set forth in claim 1 wherein said layer rubber is secured to a metal backing.